United States Patent [19]
Takeuchi

[11] 3,857,135
[45] Dec. 31, 1974

[54] VEHICLE POLISHING APPARATUS

[75] Inventor: Shigeo Takeuchi, Nagoya, Japan

[73] Assignee: Takeuchi Tekko Kabushiki Kaisha, Nagoya-shi, Japan

[22] Filed: July 3, 1973

[21] Appl. No.: 376,212

[30] Foreign Application Priority Data
Sept. 16, 1972  Japan................................ 47-106980

[52] U.S. Cl. ............. 15/230.14, 29/125, 15/DIG. 2,
51/331;332;334;337;358;394;395
[51] Int. Cl. .......................... B24d 13/06, B60s 3/06
[58] Field of Search........... 15/89, 97 R, 210.5, 230,
15/230.1, 230.14, 230.16, 230.19; 29/121 R;
259/181; 416/73, 240

[56] References Cited
UNITED STATES PATENTS

| | | | |
|---|---|---|---|
| 2,226,624 | 12/1940 | MacFarland et al............. | 15/230.14 |
| 2,559,385 | 7/1951 | Bahr................................ | 15/230.1 |
| 2,562,688 | 7/1951 | Bahr................................ | 15/230.14 X |
| 2,711,619 | 6/1955 | Davies............................. | 15/230.14 |
| 2,908,116 | 10/1959 | Peterson.......................... | 51/356 |
| 3,774,259 | 11/1973 | Genaro............................ | 15/97 R |

*Primary Examiner*—Daniel Blum
*Attorney, Agent, or Firm*—Waters, Roditi, Schwartz & Nissen

[57] ABSTRACT

A vehicle polishing apparatus comprising a rotary buff which includes a driven shaft, a stack of short cylindrical segments fixedly mounted on the shaft, and a plurality of radially fluted fan-shaped elementary buffs formed of pliable material and removably fixed at the base end to the outer periphery of each of said cylindrical segments. The elementary buffs are readily yieldable in use to any irregularities of the vehicle surface including fender back mirrors and an antenna rod and thus cause no damage to such vehicle parts. Also, when injured or worn out, any of such elementary buffs can be readily replaced individually or together with the associated cylindrical segment. This substantially reduces the cost of maintenance and shut down time of the apparatus.

1 Claim, 3 Drawing Figures

VEHICLE POLISHING APPARATUS

BACKGROUND AND SUMMARY OF THE INVENTION

This invention relates generally to vehicle polishing apparatus workable on the surface of a vehicle, previously washed and dried, to give a good luster thereto.

Vehicle polishing apparatus are known which includes a rotary buff movable relative to the vehicle surface while rotating in sliding engagement therewith for automatic wax coating or buffing operation. However, in operation of previous forms of such apparatus, the rotary buff has occasionally been caught by a fender back mirror, an antenna rod or other vehicle part projecting from the vehicle surface and thus caused damage to such part.

In view of the above, the present invention has for its object the provision of a new and improved vehicle polishing apparatus which is free from such difficulties as described above, including a rotary buff comprised of a multitude of pliable elementary buffs particularly adapted to smoothly pass over any projection on the vehicle surface, and thus is capable of efficiently wax coating or buffing the vehicle surface without any danger of damaging projecting parts of the vehicle.

Another object of the present invention is to provide a vehicle polishing apparatus of the character described in which any of the elementary buffs can be readily replaced when injured or worn out without necessitating any lengthy shut down of the apparatus.

These and other objects, features and advantages of the present invention will be apparent from the following description when taken in conjunction with the accompanying drawings.

BRIEF DESCRIPTION OF THE DRAWINGS

In the accompanying drawings, which illustrate one preferred embodiment of the present invention and in which.

DESCRIPTION OF THE PREFERRED EMBODIMENT

Figure 1:
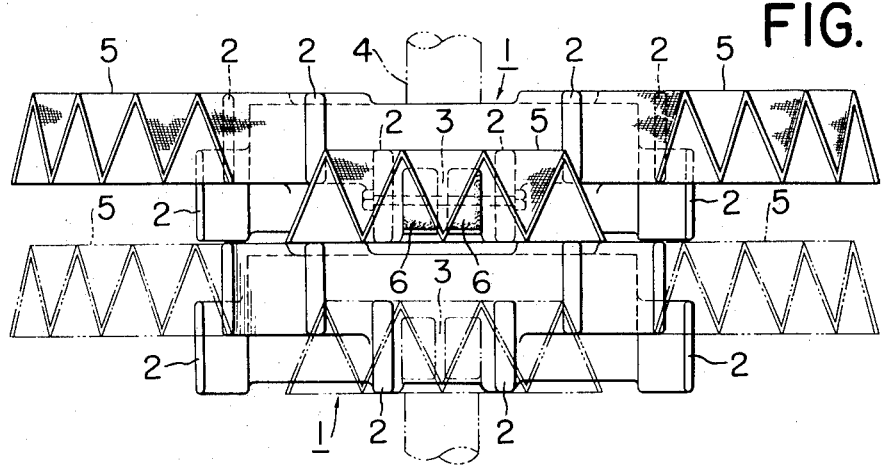
FIG. 1 is a fragmentary plan view of the rotary buff assembly of the embodiment.
Figure 2:
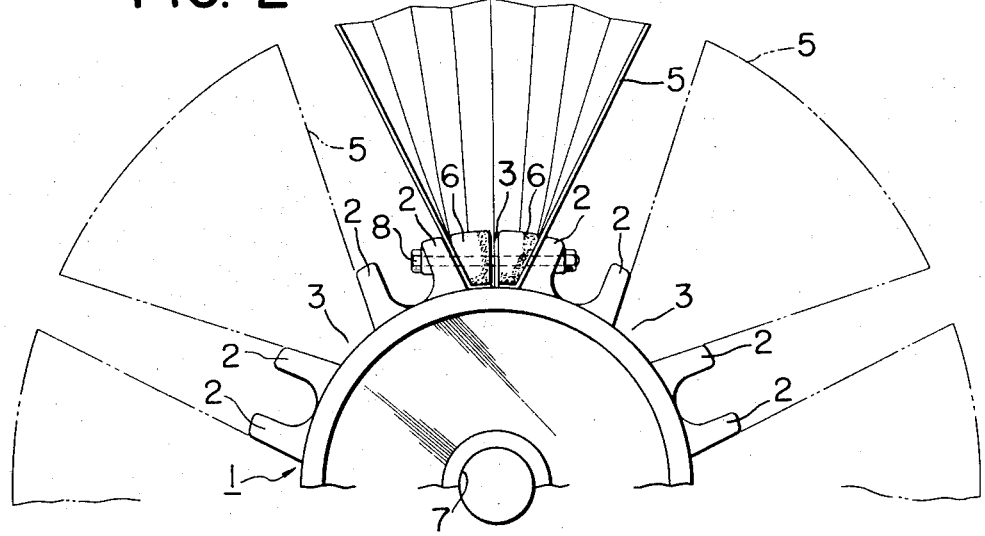
FIG. 2 is a fragmentary side elevation of one of the cylindrical segments shown in FIG. 1.

Referring to the drawings and particularly to FIGS. 1 and 2, reference numeral 1 designates a number of short cylindrical segments formed of elastic material such as rubber and stacked on a support shaft 4 in closely fitting relation thereto. Formed in the outer periphery of each of cylindrical segments 1 are a plurality of circumferentially spaced-apart transverse recesses 3 which are each defined by a pair of radially extending projections 2 and radially outwardly divergent in cross section. As shown in FIG. 1, the recesses 3 on each cylindrical segment 2 are alternately offset in the direction of the axis thereof so that such recesses in the whole stack of cylindrical segments are arranged in staggered relation to each other. Reference number 5 designates radially fluted fan-shaped elementary buffs mounted on the periphery of each of cylindrical segments. Specifically, each of the fan-shaped elementary buffs 5 is inserted at the base in the corresponding recess 3 with a pair of tapered blocks or pads 6 of elastic material such as rubber fitted therein in interlocking relation with the buff edges and is bound together with the pads 6 and radial projections 2 by bolt means 8, which extends through the component parts 2, 6 and the base portion of the fan-shaped elementary buff 5.

Figure 3:
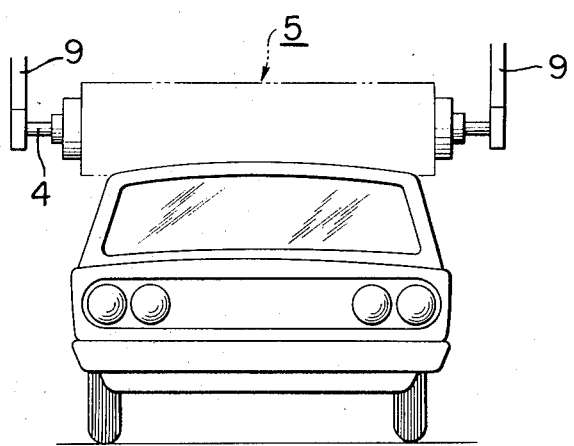
FIG. 3 is a front elevational view of the vehicle polishing apparatus embodying the present invention, showing the apparatus in the state working on a vehicle.

As shown in FIG. 3, the support shaft 4, carrying the stack of cylindrical segments 1, is rotatably supported by a pair of spaced-apart rock arms 9 which are rockably suspended by appropriate means from a portal or other frame of the apparatus through which a vehicle to be polished progresses. It is to be understood that the support shaft 4 is operably associated with an appropriate drive means, not shown.

Description will next be made of the operation of the apparatus described above. For polishing operation, the buff shaft 4 is driven to rotate and the vehicle to be polished is advanced into contacting engagement with the rotary buff assembly including the shaft 4, cylindrical segments 1 and elementary buffs 5 secured thereto. As will readily be understood, the rotating buff assembly tending to descend under gravity, the elementary buffs 5 thereon are held in sliding engagement with the vehicle surface effectively to wax coat or buff the latter. It is to be noted that, during the operation, the elementary buffs 5 rotating in direct sliding engagement with the vehicle surface can pass over the latter with particular smoothness even when they meet vehicle parts projecting from the body surface, including fender back mirrors, and an antenna rod, owing to their particular yieldability resulting from their material and fan-like formation, which allows them not only to freely spread and contract in their respective planes but also to freely flex sidewise and back and forth in the direction of rotation. In other words, the elementary buffs 5 can smoothly proceed past any projecting vehicle part, yielding under the pressure of contact therewith. As will readily be appreciated, this eliminates any danger that the projecting vehicle parts be damaged in the buffing operation and enables the apparatus to efficiently coat wax or buff the vehicle surface including the areas close to the projecting parts.

It will further be appreciated that, since in the apparatus of the present invention the elementary buffs 5 are removably fixed to the short cylindrical segments 1, which in turn are removably fitted over the support shaft 4, any of the elementary buffs 5, injured or worn out, can readily be replaced individually or together with the associated cylindrical segment or segments. This obviously reduces the cost of maintenance and shut down time of the apparauts to a substantial extent.

While one preferred embodiment of the present invention has been shown and described, it will be apparent to those skilled in the art that various changes and modifications may be made therein without departing from the spirit of the invention or from the scope of the appended claim.

What is claimed is:

1. A cylindrical rotary buff assembly for use in vehicle polishing apparatus, comprising: a rotatable shaft, a stack of relatively short cylindrical segments closely and removably fitted over said shaft, each of said cylindrical segments being formed on their outer peripheral surfaces with a plurality of circumferentially spaced, radial projections, adjacent ones of said projections defining recesses; a plurality of radially fluted fan-shaped pliable elementary buffs being positioned in the plane of said cylindrical segments, each of said buffs having an inner end and an outer end and expanding outwardly from its inner end to its outer end with its outer peripheral edge formed in zigzag form, said buffs being individually removably fixed at their inner ends in alternate ones of said recesses of said projections by fastener means, said elementary buffs on each of said cylindrical segments being spaced from each other at their adjacent outer ends and being in staggered relation with those on adjacent ones of said cylindrical segments.

* * * * *